(12) United States Patent
Mihara

(10) Patent No.: US 9,065,959 B2
(45) Date of Patent: Jun. 23, 2015

(54) IMAGE SENSOR UNIT, IMAGE READING APPARATUS, AND IMAGE FORMING APPARATUS

(71) Applicant: CANON COMPONENTS, INC., Kodama-gun, Saitama (JP)

(72) Inventor: Akio Mihara, Saitama (JP)

(73) Assignee: CANON COMPONENTS, INC. (JP)

( * ) Notice: Subject to any disclaimer, the term of this patent is extended or adjusted under 35 U.S.C. 154(b) by 0 days.

(21) Appl. No.: 13/723,467

(22) Filed: Dec. 21, 2012

(65) Prior Publication Data

US 2013/0163057 A1    Jun. 27, 2013

(30) Foreign Application Priority Data

Dec. 22, 2011  (JP) ................................. 2011-281602
Dec. 14, 2012  (JP) ................................. 2012-273443

(51) Int. Cl.
  *H04N 1/04*   (2006.01)
  *H04N 1/028*  (2006.01)
  *H04N 1/193*  (2006.01)

(52) U.S. Cl.
  CPC ............ *H04N 1/028* (2013.01); *H04N 1/1931* (2013.01); *H04N 1/1932* (2013.01); *H04N 1/1933* (2013.01); *H04N 1/1934* (2013.01); *H04N 1/1935* (2013.01); *H04N 1/1938* (2013.01)

(58) Field of Classification Search
  CPC . H04N 1/193; H04N 1/40056; H04N 3/1581; H04N 27/14665; H04N 1/031

USPC ......... 358/482, 483, 497, 474, 505, 512–514; 250/208.1, 234–236, 239, 216
See application file for complete search history.

(56) References Cited

U.S. PATENT DOCUMENTS

| 5,587,814 | A  | * | 12/1996 | Mihara et al. ................. 358/512 |
| 5,594,260 | A  |   | 1/1997  | Tsutsui et al. |
| 6,285,047 | B1 |   | 9/2001  | Machida et al. |
| 6,486,979 | B1 | * | 11/2002 | Sawada ......................... 358/483 |
| 7,652,805 | B2 | * | 1/2010  | Oguri et al. ................... 358/482 |
| 8,058,602 | B2 | * | 11/2011 | Wang et al. ................ 250/208.1 |
| 2006/0238631 | A1 |  | 10/2006 | Ligozat et al. |
| 2008/0248457 | A1 | * | 10/2008 | Hosoya et al. ..................... 435/4 |
| 2010/0213355 | A1 |  | 8/2010  | Wang |
| 2011/0051200 | A1 |  | 3/2011  | Iwasaki et al. |
| 2013/0163021 | A1 | * | 6/2013  | Kinoshita .................... 358/1.13 |
| 2013/0181311 | A1 | * | 7/2013  | Sugiyama ..................... 257/432 |

FOREIGN PATENT DOCUMENTS

EP    0 751 568 A2    1/1997
EP    1 650 949 A1    4/2006
(Continued)

OTHER PUBLICATIONS

Extended European Search Report issued in corresponding EPC Application No. 12198868.7 dated Jan. 8, 2014.

(Continued)

*Primary Examiner* — Cheukfan Lee
(74) *Attorney, Agent, or Firm* — Rossi, Kimms & McDowell LLP

(57) ABSTRACT

In an image sensor unit, sensor substrates include a plurality of edges arranged on a substrate holder in a longitudinal direction at predetermined intervals, sensor chips at the edges are mounted beyond the edges, and the substrate holder includes positioning portions that position the sensor chips.

15 Claims, 13 Drawing Sheets

(56) References Cited

FOREIGN PATENT DOCUMENTS

| JP | 7086541 A | 3/1995 |
| JP | 9-275200 A | 10/1997 |
| JP | 2004-336201 A | 11/2004 |
| JP | 2009-514257 A2 | 4/2009 |
| JP | 2011-003956 A | 1/2011 |
| JP | 2011-55344 A | 3/2011 |

OTHER PUBLICATIONS

Office Action issued in corresponding Japanese Patent Application 2012-273443 dated Jan. 7, 2014.

* cited by examiner

IMAGE SENSOR UNIT, IMAGE READING APPARATUS, AND IMAGE FORMING APPARATUS

CROSS-REFERENCE TO RELATED APPLICATIONS

This application is based upon and claims the benefit of priority of the prior Japanese Patent Application No. 2011-281602, filed on Dec. 22, 2011, and the Japanese Patent Application No. 2012-273443, filed on Dec. 14, 2012, the entire contents of which are incorporated herein by reference.

BACKGROUND OF THE INVENTION

1. Field of the Invention

The present invention relates to an image sensor unit, an image reading apparatus, and an image forming apparatus. Particularly, the present invention relates to an image sensor unit, an image reading apparatus, and an image forming apparatus that read large originals and the like.

2. Description of the Related Art

Readable lengths (hereinafter, "read lengths") of originals are generally about A4, B4, and A3 sizes in an image sensor unit used in an image reading apparatus, such as a facsimile and a scanner. In recent years, an elongated image sensor unit that can read large originals in A2, A1, and A0 sizes exceeding the read length of A3 size is used in an image reading apparatus, such as an electronic white board.

In the image sensor unit of the image reading apparatus that reads large originals and the like exceeding the A3 size, a plurality of sensor substrates shorter than the A3 size, on which a plurality of sensor chips are mounted, are arranged in series in a main-scan direction. In the serial arrangement of the sensor substrates, it is ideal to extremely reduce intervals between the sensor chips mounted on adjacent sensor substrates to reduce image missing sections in reading. However, high reading accuracy is not demanded in the image sensor unit used for an electronic white board or the like, and there is no problem even if the intervals between the sensor chips are large.

On the other hand, the same read quality as that of a general scanner is demanded in an image reading apparatus that needs fine reading of a large map and the like, and generation of an image missing section needs to be prevented. For example, Patent Document 1 discloses a photoelectric conversion apparatus elongated by connecting a plurality of wiring boards (sensor substrates) on which LED chips (sensor chips) are arranged.

Patent Document 1

Japanese Laid-open Patent Publication No. 7-086541

In the photoelectric conversion apparatus disclosed in Patent Document 1, the sensor chips protrude from ends of the sensor substrates to arrange the sensor chips at equal intervals in a main-scan direction when adjacent sensor substrates are connected. To connect the adjacent sensor substrates, accuracy in a sub-scan direction is required in addition to accuracy in the main-scan direction. More specifically, the sensor chips need to be arranged at equal intervals in the main-scan direction, and the sensor chips need to be arranged without deviation in the sub-scan direction. However, alignment (positioning) in the sub-scan direction is not taken into account in the photoelectric conversion apparatus, and the alignment of the sensor chips is not easy.

SUMMARY OF THE INVENTION

The present invention has been made in view of the problem, and an object of the present invention is to easily position adjacent sensor chips when a plurality of sensor substrates are arranged in a main-scan direction.

The present invention provides an image sensor unit including: a light source that illuminates an object to be read; a sensor substrate unit that is arranged with a plurality of sensor substrates including a plurality of photoelectric conversion elements arranged and mounted in a line in a longitudinal direction; a substrate holder on which the sensor substrates are mounted; a light condenser that focuses light from the object to be read on the sensor substrate unit; and a supporting body that supports the light source, the substrate holder, and the light condenser, wherein the sensor substrates are mounted on the substrate holder arranged in the longitudinal direction at predetermined intervals, the photoelectric conversion elements at the edges of the sensor substrates are mounted beyond the edges, and the substrate holder includes positioning means that positions the photoelectric conversion elements.

The present invention provides an image reading apparatus including: an image sensor unit; and image reading means that reads light from an object to be read while relatively moving the image sensor unit and the object to be read, wherein the image sensor unit is the image sensor unit described above.

The present invention provides an image forming apparatus including: an image sensor unit; image reading means that reads light from an object to be read while relatively moving the image sensor unit and the object to be read; and image forming means that forms an image on a recording medium, wherein the image sensor unit is the image sensor unit described above.

DETAILED DESCRIPTION OF THE PREFERRED EMBODIMENTS

Figure 1:
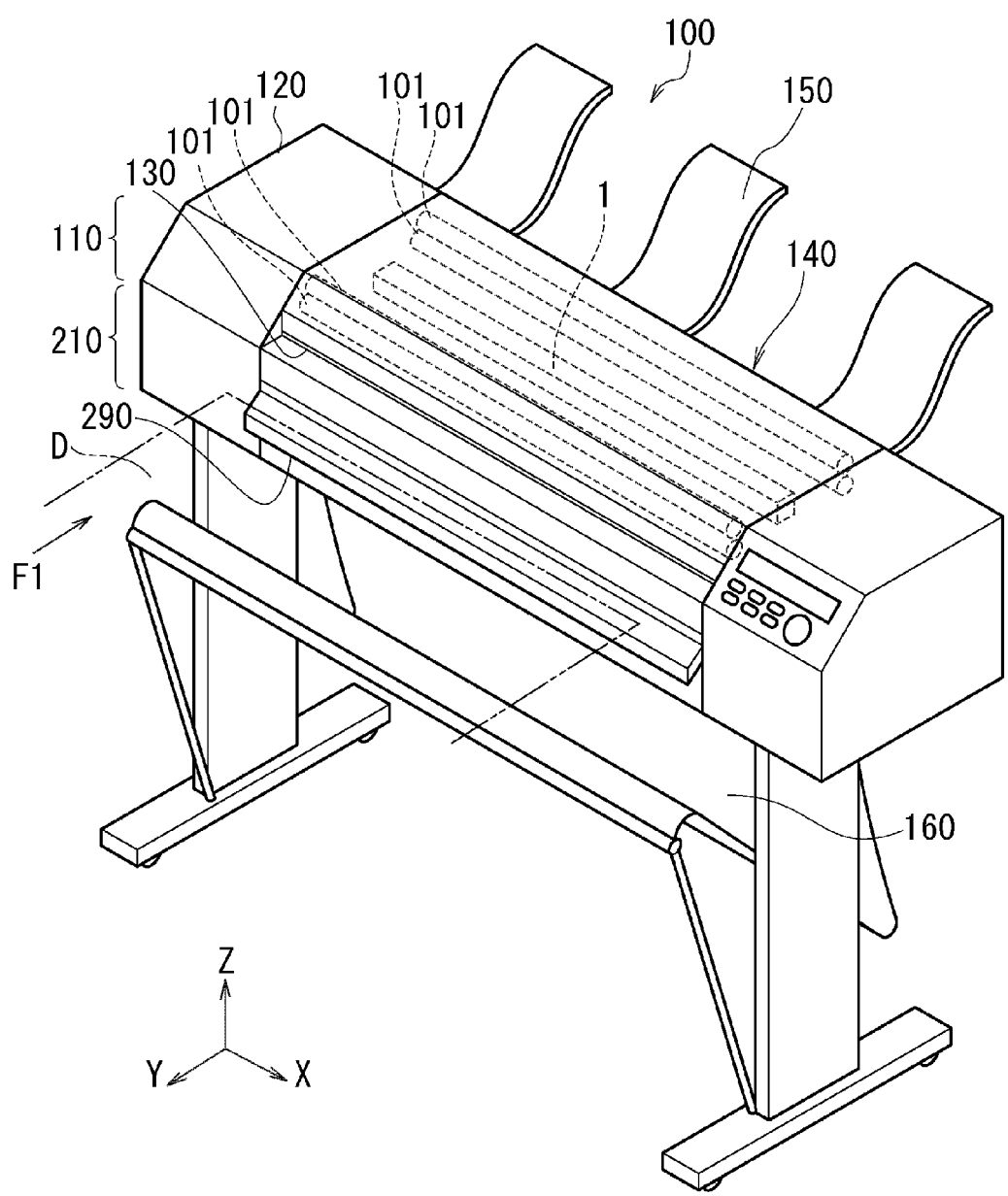
FIG. 1 is a perspective view illustrating an appearance of an MFP 100 including an image sensor unit 1 according to the present embodiments.

Embodiments that can apply the present invention will now be described in detail with reference to the drawings.

In the present embodiments, an image sensor unit described later as well as an image reading apparatus and an image forming apparatus to which the image sensor unit is applied will be described. In the drawings described below, a main-scan direction of the image sensor unit is indicated by an X direction, a sub-scan direction is indicated by a Y direction, and a direction orthogonal to the main-scan direction and the sub-scan direction is indicated by a Z direction, as necessary. In the image reading apparatus and the image forming apparatus, the image sensor unit emits light to an original D as an object to be read, and reflected light is converted to an electric signal to read an image (reflection reading). The object to be read is not limited to the original D, and other objects to be read can also be applied. Transmission reading can also be applied.

A structure of a multi-function printer (MFP) as sample of an image reading apparatus or an image forming apparatus will be described with reference to FIG. 1. FIG. 1 is a perspective view illustrating an appearance of an MFP 100 that can handle a large original. As shown in FIG. 1, the MFP 100 includes: an image reading portion 110 as image reading means that is a sheet-feed type image scanner and that reads reflected light from a large original D in an A0 size, A1 size, or the like; and an image forming portion 210 as image forming means that forms (prints) an image of the original D on a roll sheet R (recording paper) as a recording medium.

The image reading portion 110 has a function of a so-called image scanner and is configured, for example, as follows. The image reading portion 110 includes: a housing 120; a paper feeding opening 130; an original discharge opening 140; an original recovery unit 150; a sheet recovery unit 160; an image sensor unit 1; and original conveyor rollers 101.

The image sensor unit 1 is, for example, a contact image sensor (CIS) unit. The image sensor unit 1 is fixed in the housing 120.

In the image reading portion 110, the original D inserted from the paper feeding opening 130 to the housing 120 is placed between the original conveyor rollers 101 rotated and driven by a driving mechanism and conveyed relative to the image sensor unit 1 at a predetermined conveyance speed. The image sensor unit 1 optically reads the conveyed original D, and a sensor chip 30 described later converts the original D to an electric signal to perform a reading operation of an image. The original D subjected to image reading is conveyed by the original conveyor rollers 101 and discharged from the original discharge opening 140. The original recovery unit 150 disposed on the backside of the housing 120 recovers the original D discharged from the original discharge opening 140.

Figure 2:
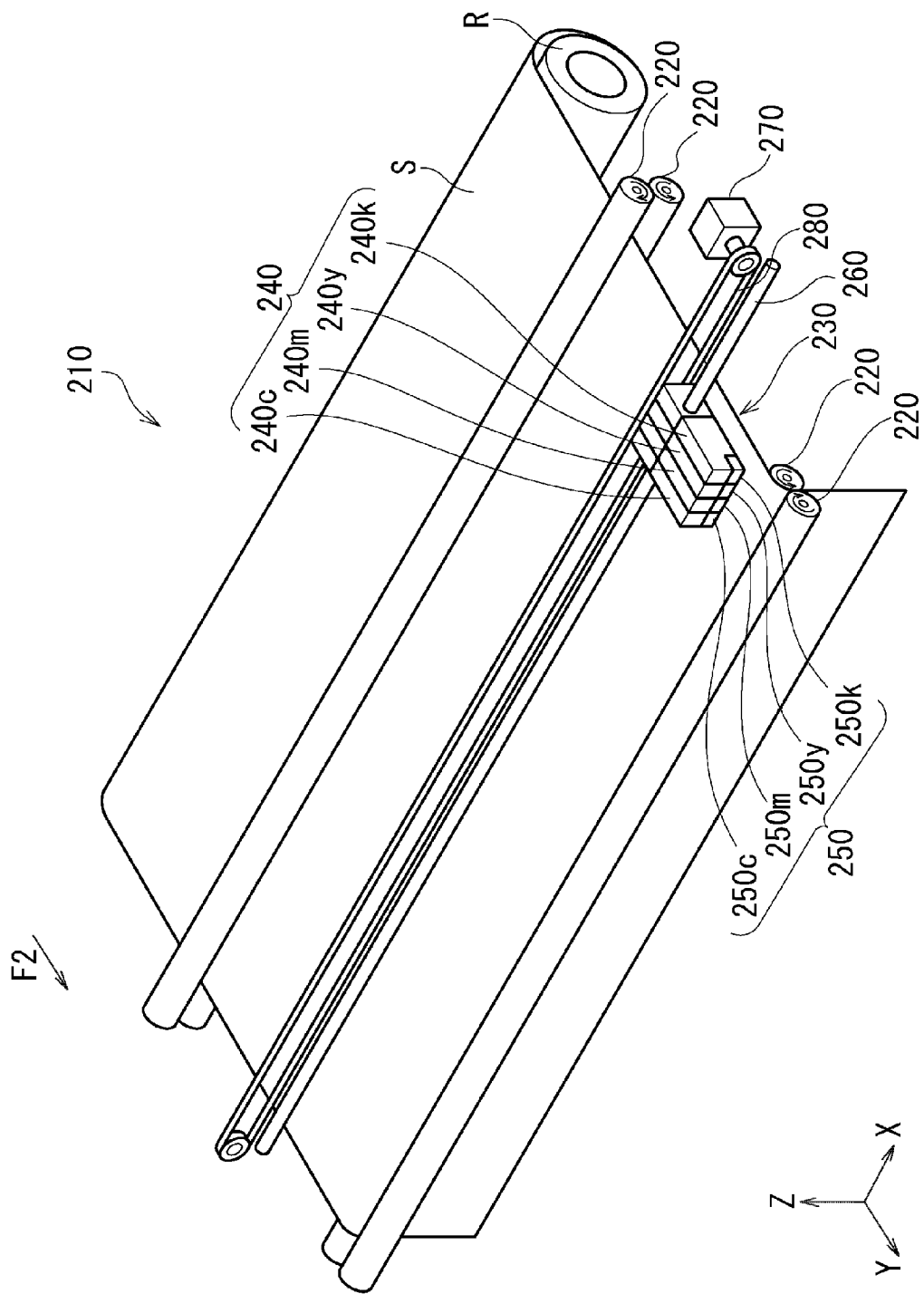
FIG. 2 is a schematic view illustrating a structure of an image forming portion 210 in the MFP 100.

FIG. 2 is a schematic view illustrating a structure of the image forming portion 210.

The image forming portion 210 with a function of a so-called printer is housed in the housing 120 and is configured, for example, as follows. The image forming portion 210 includes a roll sheet R, sheet conveyor rollers 220, and a printer head 230. The printer head 230 includes, for example, ink tanks 240 (240c, 240m, 240y, and 240k) with cyan C, magenta M, yellow Y, and black K inks and discharge heads 250 (240c, 240m, 240y, and 250k) arranged on the ink tanks 240, respectively. The image forming portion 210 also includes a printer head slide shaft 260, a printer head drive motor 270, and a belt 280 attached to the printer head 230. As shown in FIG. 1, the image forming portion 210 further includes a sheet discharge opening 290 from which a printed sheet S is discharged.

In the image forming portion 210, the sheet S as one end of the continuous roll sheet R is placed between the sheet conveyor rollers 220 rotated and driven by the driving mechanism and is conveyed in a conveyance direction F2 to a printing position. The printer head drive motor 270 mechanically moves the belt 280, and the printer head 230 moves in the printing direction (the main-scan direction) along the printer head slide shaft 260 to print the image on the sheet S based on the electric signal. The operation is repeated until the printing is finished, and the printed sheet S is cut in the main-scan direction. The cut sheet S is discharged from the sheet discharge opening 290 by the sheet conveyor rollers 220. The sheet recovery unit 160 disposed below the housing 120 recovers the sheet S discharged from the sheet discharge opening 290.

Although an inkjet-type image forming apparatus has been described as the image forming portion 210, the type can be any type, such as an electrophotographic type, a thermal transfer type, and a dot impact type.

First Embodiment

Constituent members of the image sensor unit 1 will be described with reference to FIGS. 3 and 4.

Figure 3:
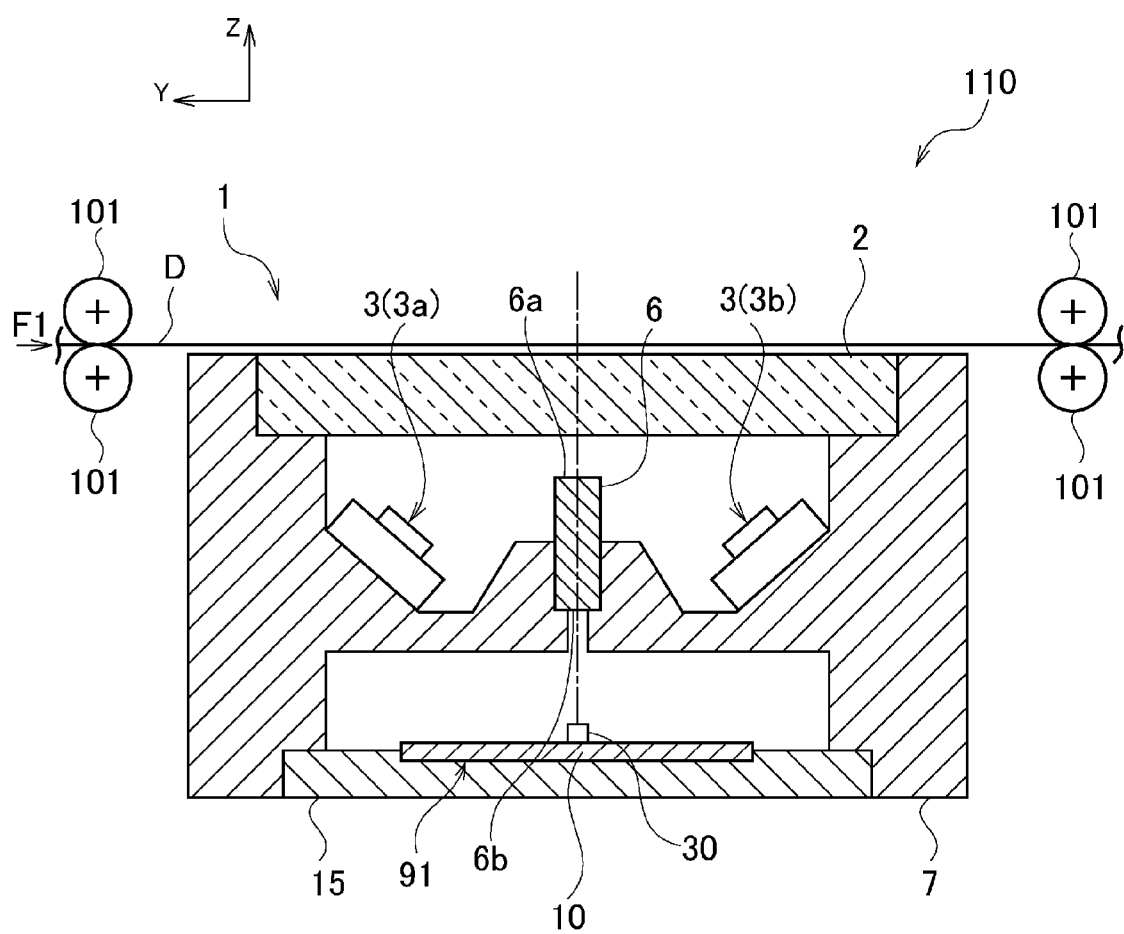
FIG. 3 is a sectional view illustrating a configuration of part of an image reading portion 110 in the MFP 100 including the image sensor unit 1 according to the present embodiments.

FIG. 3 is a sectional view illustrating a configuration of part of the image reading portion 110 including the image sensor unit 1. FIG. 4 is a schematic exploded perspective view of the image sensor unit 1.

The image sensor unit 1 includes a cover glass 2, light sources 3, rod-lens arrays 6 as light condensers, a sensor substrate unit 91, sensor chips 30 as photoelectric conversion elements, a frame 7 as a supporting body that houses these components, and the like. The cover glass 2 and the frame 7 of the components are formed long in the main-scan direction to handle the read length of the large original D.

The frame 7 houses the components of the image sensor unit 1. The frame 7 is rectangular, and a plurality of projections and recesses are formed inside to position and support the components of the image sensor unit 1.

The cover glass 2 prevents dust from entering the frame 7. The cover glass 2 is planar and fixed on an upper part of the frame 7.

The light sources 3 (3a and 3b) illuminate the original D. The light sources 3a and 3b are fixed at positions below the cover glass 2 and symmetric about the rod-lens arrays 6. As shown in FIG. 4, each light source 3 includes, for example: light emitting elements 4r, 4g, and 4b with wavelengths of three colors of red R, green G, and blue B; and a substrate 5 for mounting the light emitting elements 4r, 4g, and 4b. The light emitting elements 4r, 4g, and 4b are, for example, LED chips and are mounted at predetermined intervals in a predetermined order on the substrate 5 formed long in the main-scan direction. The light sources 3a and 3b of the present embodiment include a plurality of substrates arranged in the main-scan direction, the substrates used in an image sensor unit that reads normal sized originals (for example, A4 and A3 sizes).

The rod-lens arrays 6 are optical members to focus the reflected light from the original D on the sensor chip 30 mounted on a sensor substrate 10. The rod-lens array 6 is disposed at a center position of the light source 3a and the light source 3b. The sensor chip 30 is positioned on an extension of an optical axis (alternate long and short dash line illustrated in FIG. 3) formed between an incident surface 6a and an emission surface 6b of the rod-lens array 6. The rod-lens array 6 includes a plurality of imaging elements (rod-lenses) of an erect equal magnification imaging type arranged in the main-scan direction. The rod-lens arrays 6 of the present embodiment are formed by arranging a plurality of rod-lens arrays in the main-scan direction, rod-lens arrays used in an image sensor unit that reads normal sized originals.

Optical members with various well-known light condensing functions, such as various micro-lens arrays, can be applied as the light condensers.

The sensor substrate unit 91 includes a plurality of sensor substrates 10. The sensor substrate 10 includes a plurality of sensor chips 30 mounted thereon in the main-scan direction (longitudinal direction), the sensor chips 30 converting the reflected light focused by the rod-lens array 6 to electric signals. The sensor substrate unit 91 is fixed under the frame 7 through a substrate holder 15. A plurality of sensor substrates 10 in a normal size are arranged in the main-scan direction to form the sensor substrate unit 91 of the present embodiment at a predetermined read length. In this case, the adjacent sensor chips 30 can be accurately and easily positioned by mounting the sensor substrates 10 on the substrate holder 15. A method using the substrate holder 15 to arrange the sensor substrates 10 will be described later.

When the MFP 100 including the image sensor unit 1 configured as described above reads the original D, the image reading portion 110 successively activates the light emitting elements 4r, 4g, and 4b of the light sources 3a and 3b of the image sensor unit 1 to emit light on the original D conveyed by the original conveyor rollers 101 in a conveyance direction F1 at a predetermined conveyance speed. The light emitted from the light sources 3a and 3b is directed to the reading surface of the original D from two directions across the rod-lens array 6 to linearly and uniformly radiate the light throughout the main-scan direction. The original D reflects the radiated light to focus the light on photodiodes 31 described later of the sensor chips 30 through the rod-lens arrays 6. The sensor chips 30 convert the focused reflected light to electric signals, and a signal processing unit (not shown) processes the electric signals.

In this way, the image reading portion 110 reads the reflected light of R, G, and B of one scan line to complete the reading operation of one scan line in the main-scan direction of the original D. After the end of the reading operation of one scan line, a reading operation of the next one scan line is performed in the same way as the operation described above along with the movement of the original D in the sub-scan direction. In this way, the image reading portion 110 repeats the reading operation of one scan line, while conveying the original D in the conveyance direction F1, to read the image of the entire surface of the original D.

A configuration of the sensor substrate unit 91 will be described. The following description is about arrangement of two sensor substrates 10 in a line.

Figure 5A:
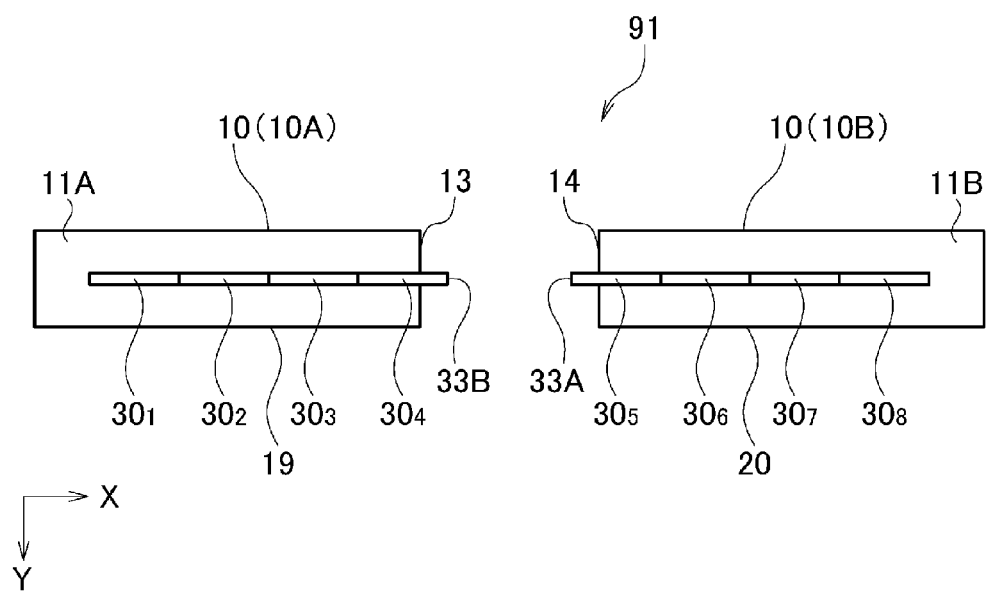
FIG. 5A is a plan view of a sensor substrate unit 91 according to a first embodiment.
Figure 5B:
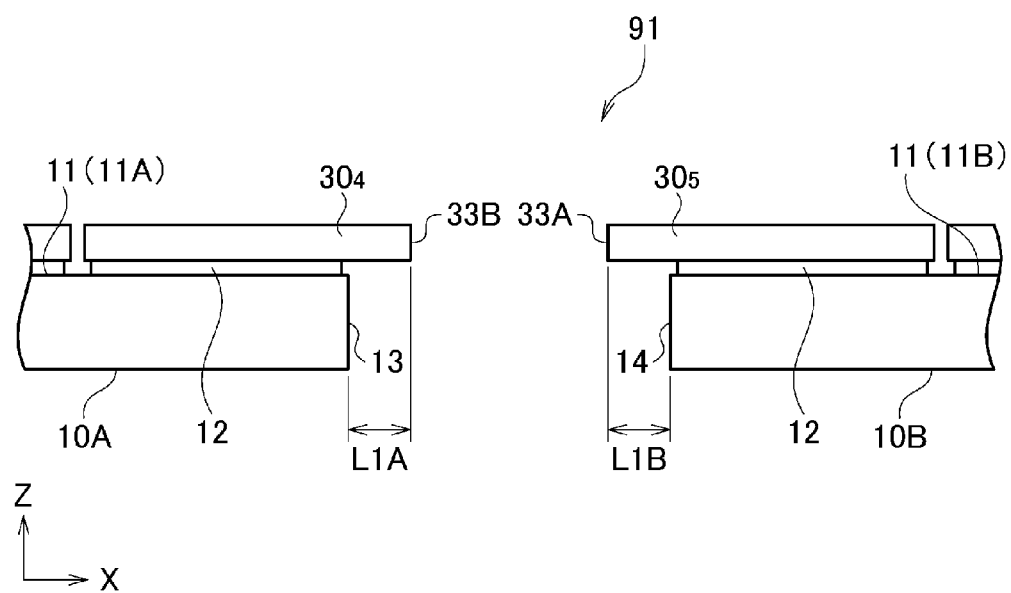
FIG. 5B is an enlarged front view of the sensor substrate unit 91 according to the first embodiment.

FIG. 5A is a plan view of the sensor substrate unit 91. FIG. 5B is a front view of the sensor substrate unit 91.

As shown in FIG. 5A, the sensor substrate 10A as a first sensor substrate and the sensor substrate 10B as a second sensor substrate are formed in a rectangular, planar shape long in the main-scan direction. For example, ceramic substrates or glass epoxy substrates can be used as the sensor substrates 10A and 10B. The sensor substrate 10A includes four sides, such as an edge 13 parallel to the sub-scan direction (width direction) and a positioning side 19 as an edge parallel to the main-scan direction (longitudinal direction). Similarly, the sensor substrate 10B includes four sides, such as an edge 14 parallel to the sub-scan direction (width direction) and a positioning side 20 as an edge parallel to the main-scan direction (longitudinal direction).

A plurality of (four each in FIG. 5A) sensor chips 30 ($30_1$ to $30_4$ and $30_5$ to $30_8$) are mounted on mounting surfaces 11A and 11B of the sensor substrates 10A and 10B, the sensor chips 30 arranged in a line in the main-scan direction (longitudinal direction) on the sensor substrates 10A and 10B. The distance from the positioning side 19 of the sensor substrate 10A to the sensor chips $30_1$ to $30_4$ coincides with the distance from the positioning side 20 of the sensor substrate 10B to the sensor chips $30_5$ to $30_8$. As shown in FIG. 5B, the sensor chips 30 ($30_1$ to $30_8$) are fixed on the mounting surfaces 11A and 11B by, for example, a thermosetting adhesive 12.

Figure 6:
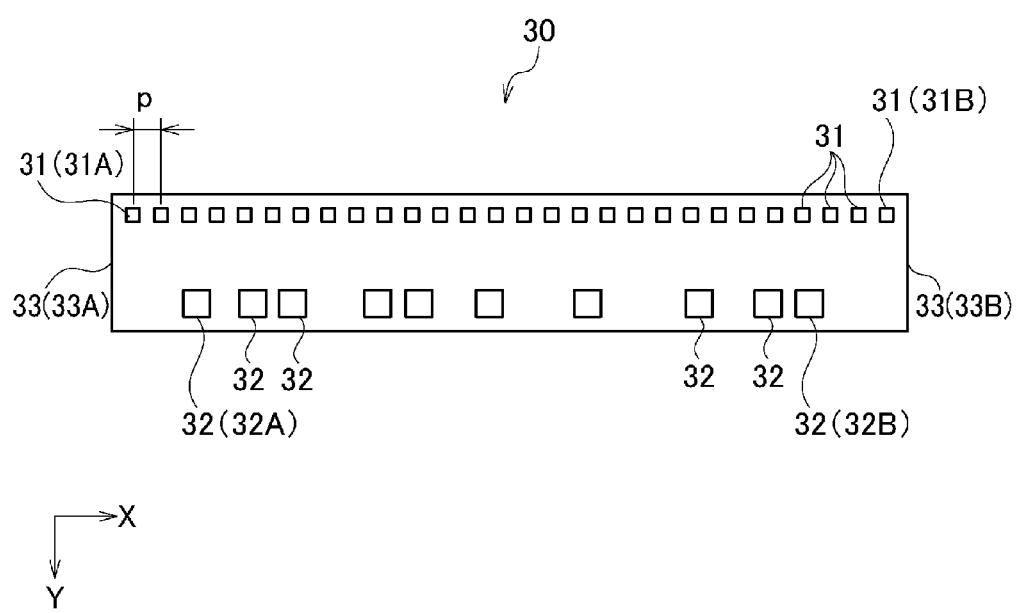
FIG. 6 is a plan view illustrating a configuration of a sensor chip 30.

FIG. 6 is a plan view illustrating a configuration of the sensor chip 30.

The sensor chip 30 includes a plurality of photodiodes 31 as light receiving elements, a plurality of pads 32, circuit patterns (not shown), and the like. The photodiodes 31 play a role to detect the reflected light and are arranged in a line in the main-scan direction at equal pitches p. The photodiodes 31 are arranged throughout the whole length in the main-scan direction of the sensor chip 30. That is, the photodiodes 31A and 31B positioned at left and right edges of the sensor chip 30 are brought into close contact with farthest tips 33 (33A and 33B) in the main-scan direction of the sensor chip 30.

Meanwhile, the pads 32 play various roles, beginning with input/output pads 32A and 32B that input and output a start signal for detecting the reflected light. The input/output pads 32A and 32B are connected to the input/output pads 32A and 32B of the adjacent sensor chip 30 by wire bonding through thin metallic wires. The connection may be through the circuit patterns (not shown) on the sensor substrates 10. The start signal of the first sensor chip 30 of each sensor substrate is input from the outside. The input/output pads 32A and 32B are disposed farther from the farthest tips 33A and 33B of the sensor chip 30 compared to the photodiodes 31A and 31B. The circuit patterns of an analog output circuit, a shift register, and the like (not shown) on the sensor chip 30 and desired circuit patterns (not shown) on the sensor substrate 10 are connected by thin metallic wires through the pads 32.

The disposition of the sensor substrates 10 and the sensor chips 30 will be further described with reference again to FIGS. 5A and 5B. In the following description of the present embodiment, a "right side" denotes the side closer to the sensor substrate 10B in the main-scan direction, and a "left side" denotes the side closer to the sensor substrate 10A in the main-scan direction.

A mounting position of the sensor chip 30 relative to the sensor substrate 10A will be described. The sensor chip $30_4$ that affects the pixel missing, that is, the sensor chip $30_4$ close to the side of the adjacent sensor substrate 10B, will be described. The sensor chip $30_4$ mounted on the sensor substrate 10A is disposed so that part of the sensor chip $30_4$ protrudes from the edge 13 on the right side of the sensor substrate 10A. More specifically, the farthest tip 33B of the sensor chip $30_4$ is positioned outside (side of the sensor chip $30_5$) of the edge 13 of the sensor substrate 10A. An amount of protrusion of the sensor chip $30_4$, that is, a distance L1A from the edge 13 to the farthest tip 33B of the sensor chip $30_4$ (see FIG. 5B), is the same as an amount of protrusion of the sensor chip $30_5$ of the sensor substrate 10B described later.

In this way, the farthest tip 33B of the sensor chip $30_4$ is positioned outside of the edge 13 of the sensor substrate 10A, and there is no obstructive member when the sensor substrates 10A and 10B are brought closer and arranged. Therefore, the position between the sensor chips $30_4$ and $30_5$ can be accurately determined.

A mounting position of the sensor chip 30 relative to the sensor substrate 10B will be described. The sensor chip $30_5$ that affects the pixel missing, that is, the sensor chip $30_5$ close to the side of the adjacent sensor substrate 10A, will be described. The sensor chip $30_5$ mounted on the sensor substrate 10B is disposed so that part of the sensor chip $30_5$ protrudes from the edge 14 on the left side of the sensor substrate 10B. More specifically, the farthest tip 33A of the sensor chip $30_5$ is positioned outside (side of the sensor chip $30_4$) of the edge 14 of the sensor substrate 10A. An amount of protrusion of the sensor chip $30_5$, that is, a distance L1B from the edge 14 to the farthest tip 33A of the sensor chip $30_5$ (see FIG. 5B), is the same as an amount of protrusion of the sensor chip $30_4$ of the sensor substrate 10A described above.

In this way, the farthest tip 33A of the sensor chip $30_5$ is positioned outside of the edge 14 of the sensor substrate 10B, and there is no obstructive member when the sensor substrates 10A and 10B are brought closer and arranged. Therefore, the position between the sensor chips $30_5$ and $30_4$ can be accurately determined.

A method of arranging the sensor substrates 10A and 10B will be described. In the present embodiment, the substrate holder 15 is used to accurately and easily position the adjacent sensor chips 30 when a plurality of sensor substrates 10 are arranged.

Figure 7A:
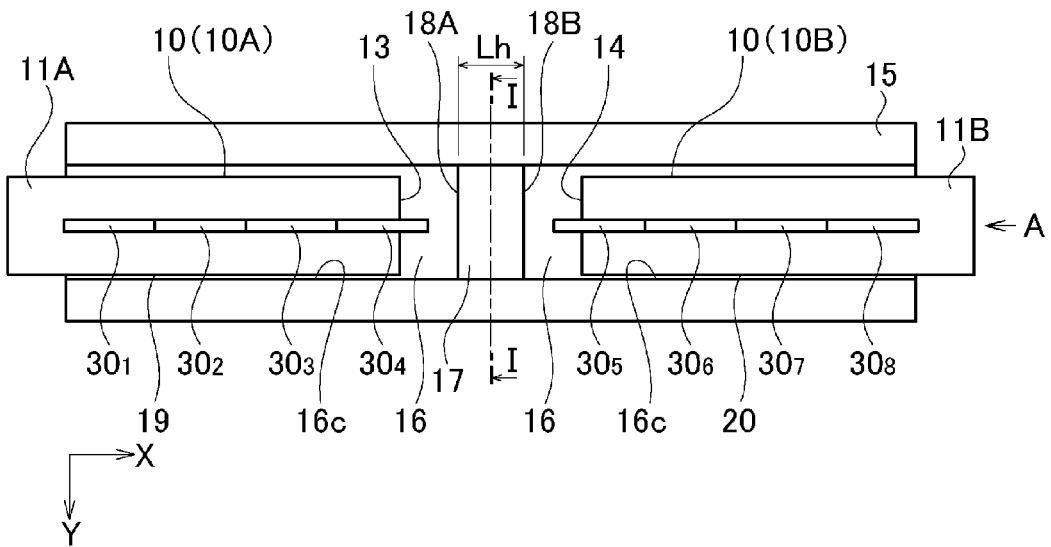
FIG. 7A is a plan view illustrating a state that adjacent sensor substrates 10 are brought closer according to the first embodiment.
Figure 7B:
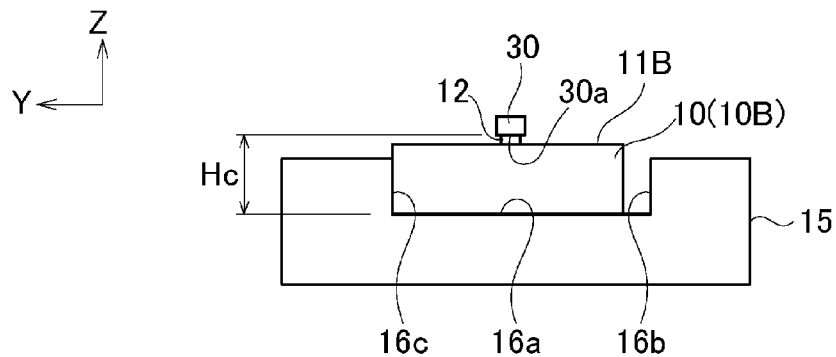
FIG. 7B is a diagram of the sensor substrate 10 and a substrate holder 15 viewed in a main-scan direction according to the first embodiment.
Figure 7C:
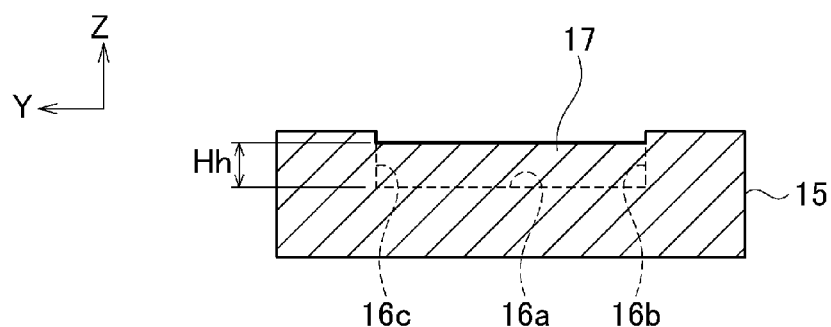
FIG. 7C is a sectional view of the substrate holder 15 according to the first embodiment.

FIG. 7A is a diagram illustrating a state before the arrangement of the sensor substrates 10. FIG. 7B is a side view as seen from an arrow A direction shown in FIG. 7A. FIG. 7C is a sectional view of a I-I line shown in FIG. 7A.

The substrate holder 15 plays a role of positioning when the sensor substrates 10A and 10B are arranged. The substrate holder 15 is formed by, for example, a synthetic resin and is formed so that the whole length is greater than a sum of the length of the sensor substrates 10A and 10B in the main-scan direction and the amount of protrusion of the sensor chips $30_4$ and $30_5$. A substrate holding portion 16 as a holding portion for loosely fitting and mounting the sensor substrates 10A and 10B is formed on the substrate holder 15, parallel to the main-scan direction (longitudinal direction). As shown in FIGS. 7B and 7C, a bottom surface 16a and opposing inner walls 16b and 16c are formed on the substrate holding portion 16.

An interval holding portion 17 as positioning means is integrally formed in the substrate holding portion 16 of the substrate holder 15.

The interval holding portion 17 is formed at a position where the sensor substrates 10A and 10B are connected, or at a middle portion of the substrate holder 15 in the longitudinal direction here. The interval holding portion 17 protrudes upward from the bottom surface 16a of the substrate holding portion 16, and an abutment portion 18A abutted with the edge 13 of the sensor substrate 10A and an abutment portion 18B abutted with the edge 14 of the sensor substrate 10B are formed parallel to the sub-scan direction (width direction). The abutment portions 18A and 18B are formed in the sub-scan direction. A length from the abutment portion 18A to the abutment portion 18B, that is, a distance Lh of the interval holding portion 17 in the main-scan direction is a predetermined distance (distance q described later) longer than the length of the sum of the amount of protrusion L1A of the sensor chip $30_4$ of the sensor substrate 10A and the amount of protrusion L1B of the sensor chip $30_5$ of the sensor substrate 10B. Therefore, the interval holding portion 17 is positioned between the sensor substrates 10A and 10B when the sensor substrates 10A and 10B are arranged, and the interval holding portion 17 plays a role to maintain the interval between the two at the distance Lh. A height Hh of the interval holding portion 17 (height dimension from the bottom surface 16a of the substrate holding portion 16 shown in FIG. 7C) is lower than a height Hc (see FIG. 7B) from the bottom surface 16a of the substrate holding portion 16 to the lower surface 30a of the sensor chip 30 fitted to the substrate holding portion 16. The height Hh of the interval holding portion 17 is lower than the mounting surfaces 11A and 11B of the sensor substrates 10A and 10B. Therefore, the height Hh of the interval holding portion 17 is smaller than the thickness dimension of the sensor substrates 10A and 10B.

A method of mounting the sensor substrates 10A and 10B on the substrate holder 15 will be described.

An assembly worker manufactures in advance the sensor substrates 10A and 10B on which the sensor chips $30_1$ to $30_4$ and $30_5$ to $30_8$ are mounted.

The assembly worker fits the sensor substrates 10A and 10B to the substrate holding portions 16 on both sides between which the interval holding portion 17 of the substrate holder 15 is placed as shown in FIGS. 7A to 7C.

The assembly worker gradually brings the sensor substrates 10A and 10B closer, while the positioning sides 19 and 20 of the sensor substrates 10A and 10B opposing the inner wall 16c are abutted with the inner wall 16c that is one of the inner walls of the substrate holding portion 16. The sensor chips $30_1$ to $30_8$ mounted on the sensor substrates 10A and 10B are equidistant from the positioning sides 19 and 20. Therefore, the positioning sides 19 and 20 of the sensor substrates 10A and 10B can be abutted to the inner wall 16c to dispose the sensor chips $30_1$ to $30_8$ mounted on the sensor substrates 10A and 10B in a line. As a result, the assembly worker can easily position the sensor chips 30 of the sensor substrates 10 in the sub-scan direction.

Figure 8A:
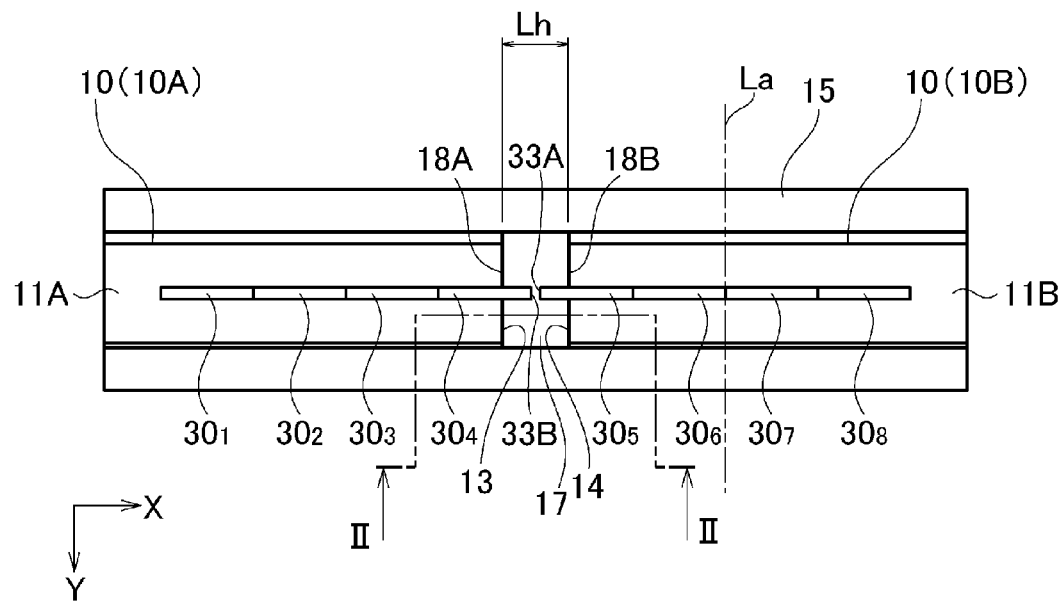
FIG. 8A is a plan view illustrating a state that the sensor substrates 10 are arranged according to the first embodiment.

The assembly worker gradually brings the sensor substrates 10A and 10B further closer to place the interval holding portion 17 between the sensor substrates 10A and 10B from the left and right as shown in FIG. 8A. As a result, the farthest tip 33B of the sensor chip $30_4$ of the sensor substrate 10A and the farthest tip 33A of the sensor chip $30_5$ of the sensor substrate 10B are arranged facing each other. As described, the distance Lh of the interval holding portion 17 in the main-scan direction is the predetermined distance q longer than the length of the sum of the amount of protrusion L1A of the sensor chip $30_4$ and the amount of protrusion L1B of the sensor chip $30_5$. Therefore, the interval between the farthest tips 33B and 33A is secured at the predetermined distance q when the sensor substrates 10A and 10B are abutted with the interval holding portion 17.

Figure 8B:
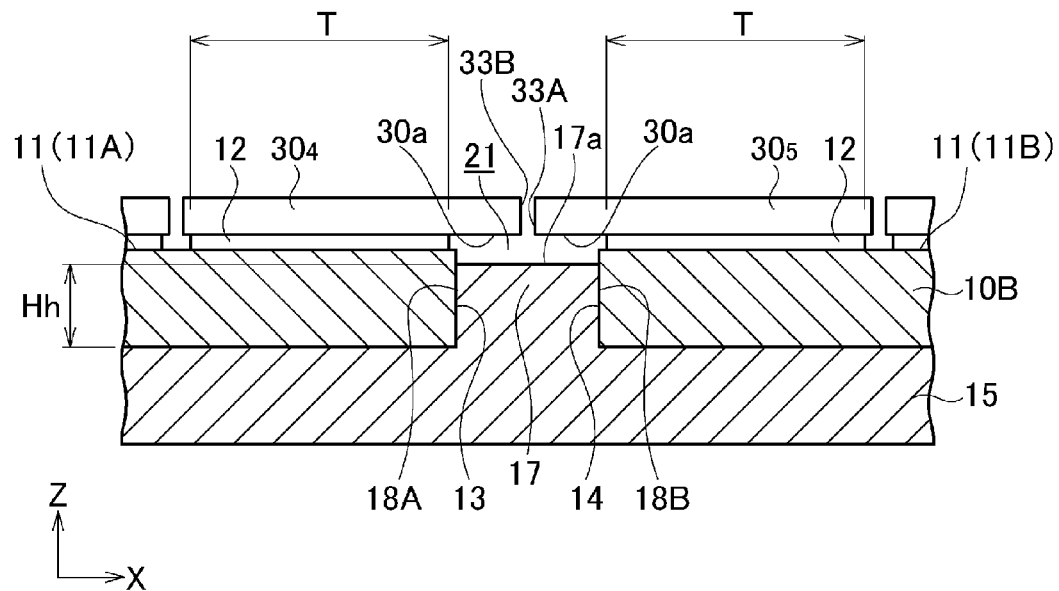
FIG. 8B is a sectional view of the state that the sensor substrates 10 are arranged according to the first embodiment.

The height Hh of the interval holding portion 17 is lower than the mounting surfaces 11A and 11B of the sensor substrates 10A and 10B and smaller than the thickness dimension of the sensor substrates 10A and 10B. Therefore, as shown in a sectional view of FIG. 8B obtained by cutting a II-II line of FIG. 8A, the sensor chips 30 and the interval holding portion 17 do not touch. More specifically, the farthest tips 33B and 33A are disposed through a space 21 from an upper surface 17a of the interval holding portion 17. Therefore, the sensor chips $30_4$ and $30_5$ are not in a flush state. Even if there is a difference in level in the direction orthogonal to the mounting surface 11, the contact of the sensor chip 30 at the lower level with the upper surface 17a of the interval holding portion 17 can be prevented.

Figure 8C:
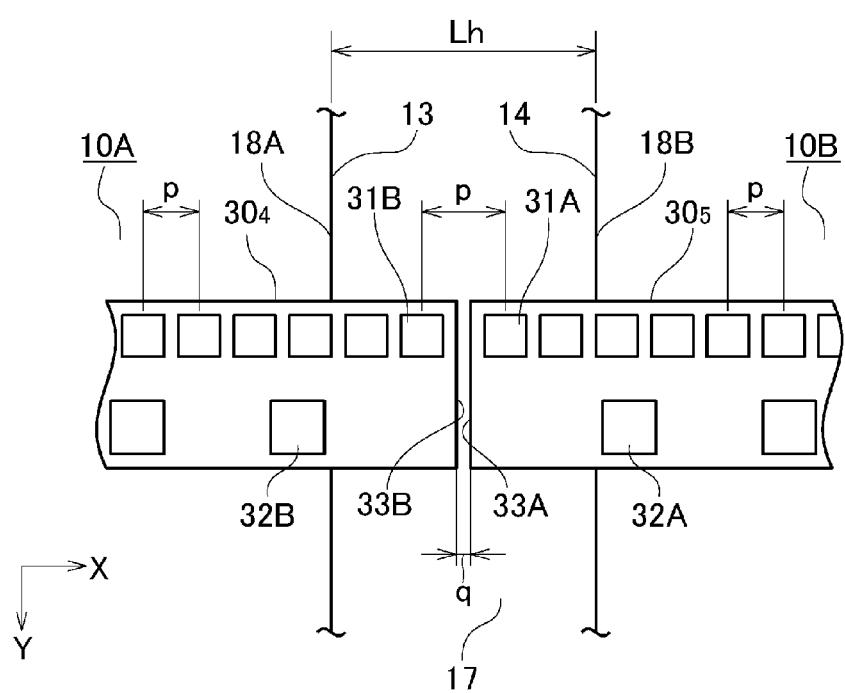
FIG. 8C is an enlarged plan view of the state that the sensor substrates 10 are arranged according to the first embodiment.

FIG. 8C is an enlarged view of the connection portion of the sensor substrates 10A and 10B of FIG. 8A. As shown in FIG. 8C, the interval between the photodiode 31B of the sensor chip $30_4$ of the sensor substrate 10A and the photodiode 31A of the sensor chip $30_5$ of the sensor substrate 10B is equidistant to the pitch p of the photodiodes 31 when the interval between the farthest tips 33B and 33A is secured at the predetermined distance q. In this way, the substrate holder 15 can accurately position the sensor substrates 10A and 10B.

The interval between the photodiode 31B of the sensor chip $30_4$ and the photodiode 31A of the sensor chip $30_5$ may be a distance greater than the pitch p, instead of the same distance as the pitch p. More specifically, as long as the interval between the photodiode 31B of the sensor chip $30_4$ and the photodiode 31A of the sensor chip $30_5$ is a predetermined distance, the image can be interpolated based on the predetermined distance after the image is read by the image sensor unit 1.

While the sensor substrates 10A and 10B are positioned, the assembly worker uses an adhesive or the like to fix and connect the sensor substrates 10A and 10B to the substrate holder 15.

As shown in FIG. 8C, the assembly worker uses thin metallic wires to electrically connect, by wire bonding, an input/output pad 32B of the sensor chip $30_4$ of the sensor substrate 10A and an input/output pad 32A of the sensor chip $30_5$ of the sensor substrate 10B. In this case, the input/output pads 32A and 32B are positioned inside of the edges 13 and 14 in the main-scan direction (longitudinal direction). Therefore, there is no space 21 shown in FIG. 8B below the input/output pads 32A and 32B, and there are the mounting surfaces 11A and 11B of the sensor substrates 10A and 10B. More specifically, there is the adhesive 12 for fixing the sensor substrates 10A and 10B with the sensor chips $30_4$ and $30_5$. Therefore, even if the input/output pads 32A and 32B are pressurized by wire bonding, the adhesive 12 and the sensor substrates 10A and 10B can support the force, and the load on the sensor chips $30_4$ and $30_5$ can be reduced. Therefore, when the sensor chips $30_4$ and $30_5$ are mounted on the sensor substrates 10A and 10B, the input/output pads 32A and 32B are fixed at positions within a range (area T shown in FIG. 8B) where the adhesive 12 is applied. The electric connection by wire bonding using the thin metallic wires may be performed just after the mounting of the sensor chips $30_1$ to $30_4$ and $30_5$ to $30_8$ on the sensor substrates 10A and 10B by the assembly worker, that is, before the fitting of the sensor substrates 10A and 10B to the substrate holding portions 16 on both sides between which the interval holding portion 17 of the substrate holder 15 is placed.

Figure 4:
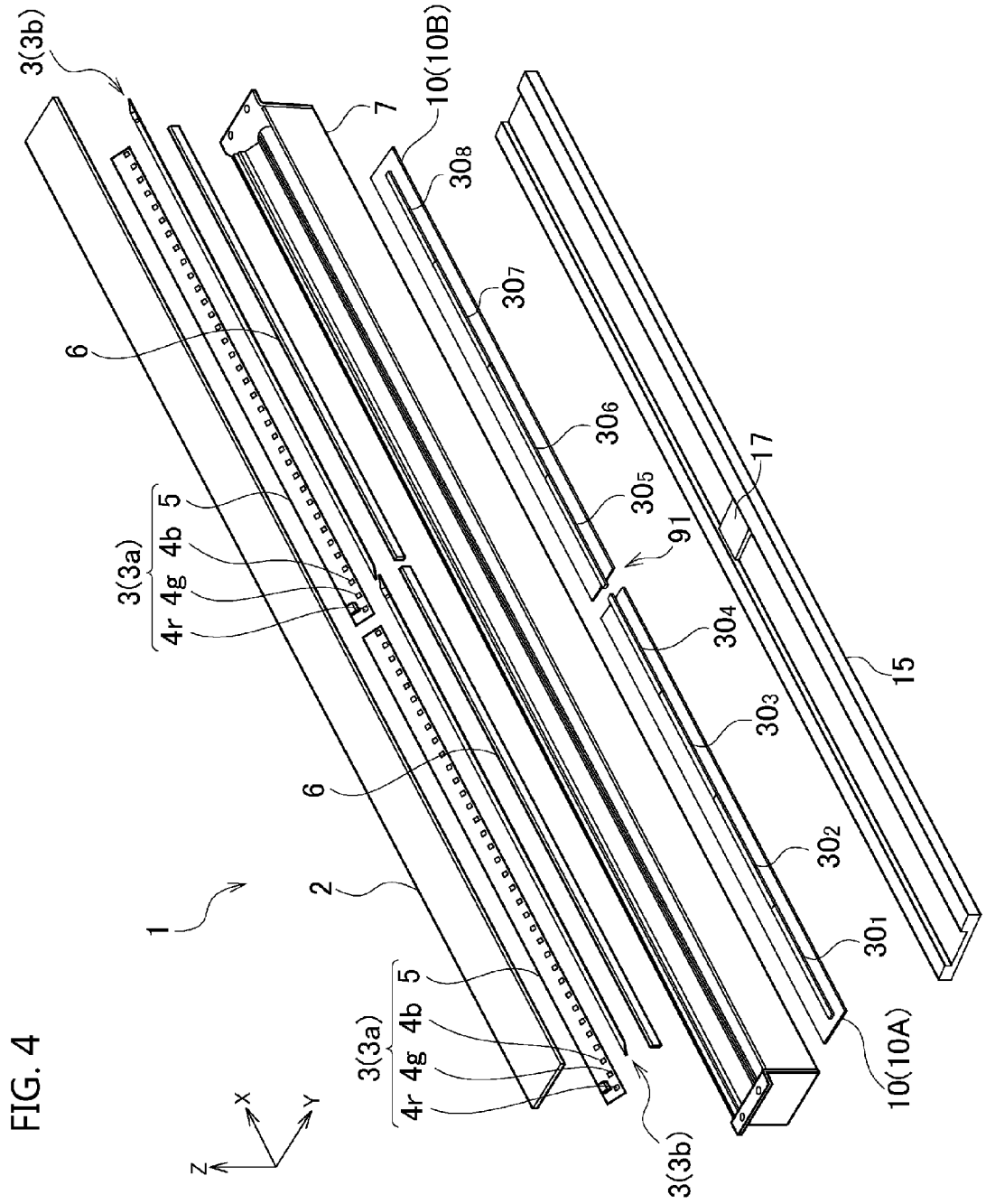
FIG. 4 is a schematic exploded perspective view of the image sensor unit 1 according to the present embodiments.

The assembly worker incorporates the substrate holder 15 including the fixed sensor substrates 10A and 10B into the frame 7 shown in FIG. 4 and fixes the substrate holder 15 to the frame 7 by screws or adhesive to manufacture the image sensor unit 1. In this way, the pitch p or the predetermined distance is maintained between the sensor chips $30_4$ and $30_5$ in the manufactured image sensor unit 1, and the image can be read without missing pixels.

In this way, the sensor substrates 10A and 10B are abutted with the inner wall 16c of the substrate holder 15 and arranged in the present embodiment. Therefore, the adjacent sensor chips 30 mounted on the sensor substrates 10A and 10B can be easily positioned without using a metallurgical microscope or a stereoscopic microscope usually used to arrange the sensor substrates 10A and 10B. Therefore, the ease of assembly can be improved. Specifically, when the sensor substrates 10A and 10B are arranged, the photodiodes 31 of the sensor chips $30_1$ to $30_4$ of the sensor substrate 10A and the photodiodes 31 of the sensor chips $30_5$ to $30_8$ of the sensor substrate 10B can be arranged in a line in the main-scan direction. The sensor substrates 10A and 10B are arranged, while the interval holding portion 17 is placed between the sensor substrates 10A and 10B. In this case, the length of the interval holding portion 17 in the main-scan direction is the distance Lh which is the sum of the amount of protrusion of the sensor chips 30 of the sensor substrates 10A and 10B and the distance q. Therefore, the interval between the farthest tip 33B of the sensor chip $30_4$ and the farthest tip 33A of the sensor chip $30_5$ can be accurately positioned at the predetermined distance q.

Although the interval holding portion 17 is integrated with the substrate holder 15 in the embodiment described above, the arrangement is not limited to this. The interval holding portion 17 may be able to be moved in the main-scan direction in the substrate holding portion 16. Although the positioning sides 19 and 20 facing the inner wall 16c of the substrate holding portion 16 are abutted with the inner wall 16c in the embodiment described above, the arrangement is not limited to this. More specifically, a similar advantageous effect can be attained by abutting the positioning sides facing the substrate holding portion 16b with the inner wall 16b to arrange the sensor substrates 10A and 10B.

Second Embodiment

Another method of arranging the sensor substrates 10A and 10B will be described. The constituent elements with the same functions are designated with the same reference numerals, and the description will not be repeated.

Figure 9A:
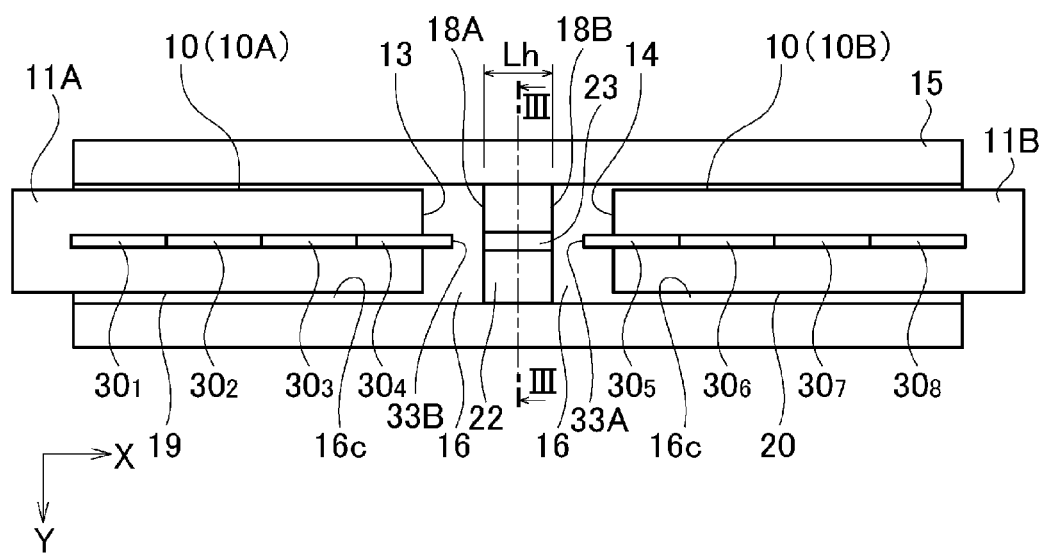
FIG. 9A is a plan view illustrating a state that the sensor substrates 10 are arranged according to a second embodiment.
Figure 9B:
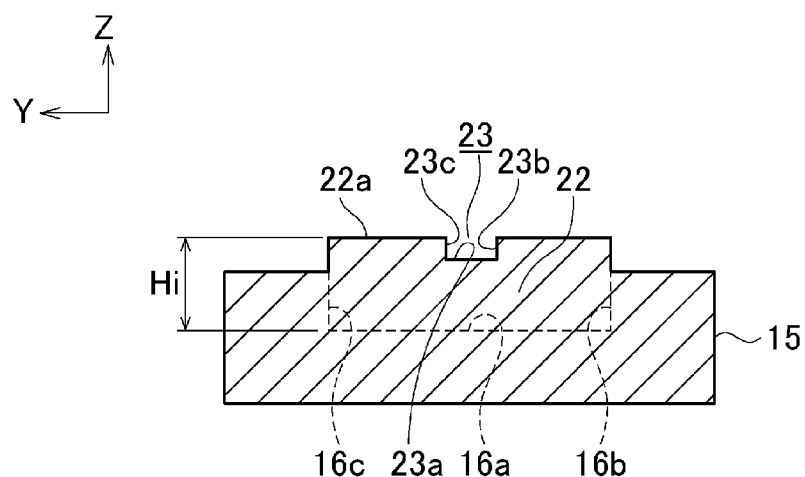
FIG. 9B is a sectional view of a substrate holder 15 according to a second embodiment.

FIG. 9A is a diagram illustrating a state before the arrangement of the sensor substrates 10. FIG. 9B is a sectional view of a line shown in FIG. 9A.

An interval holding portion 22 is integrally formed in the substrate holding portion 16 of the substrate holder 15.

The interval holding portion 22 is formed at a position where the sensor substrates 10A and 10B are connected, or at a middle portion of the substrate holder 15 in the longitudinal direction here. The interval holding portion 22 protrudes upward from the bottom surface 16a of the substrate holding portion 16, and the abutment portion 18A where the edge 13 of the sensor substrate 10A is abutted and the abutment portion 18B where the edge 14 of the sensor substrate 10B is abutted are formed. The abutment portions 18A and 18B are formed in the sub-scan direction. The length from the abutment portion 18A to the abutment portion 18B, that is, the distance Lh of the interval holding portion 22 in the main-scan direction, is the predetermined distance q longer than the length of the sum of the amount of protrusion L1A of the sensor chip $30_4$ of the sensor substrate 10A and the amount of protrusion L1B of the sensor chip $30_5$ of the sensor substrate 10B.

The height Hi of the interval holding portion 22 (height dimension from the bottom surface 16a of the substrate holding portion 16 to the upper surface 22a of the interval holding portion 22 shown in FIG. 9B) is higher than the height Hc (see FIG. 7B) from the bottom surface 16a of the substrate holding portion 16 to the lower surface 30a of the sensor chip 30 fitted to the substrate holding portion 16. A groove portion 23 is formed on the upper surface of the interval holding portion 22, parallel to the main-scan direction. The groove portion 23 has a width (sub-scan direction) for loosely fitting the farthest tip 33B of the sensor chip $30_4$ with the farthest tip 33A of the sensor chip $30_5$. As shown in FIG. 9B, a bottom surface 23a and opposing inner walls 23b and 23c are formed on the groove portion 23.

To mount the sensor substrates 10A and 10B on the substrate holder 15, the assembly worker fits the sensor substrates 10A and 10B to the substrate holding portions 16 on both sides between which the interval holding portion 17 of the substrate holder 15 is placed as shown in FIG. 9A. The assembly worker gradually brings the sensor substrates 10A and 10B closer. In this case, the assembly worker gradually brings the sensor substrates 10A and 10B closer, while the side surfaces 30b of the sensor chips $30_4$ and $30_5$ facing the inner wall 23b are abutted with the inner wall 23b that is one of the inner walls of the groove portion 23.

Figure 10A:
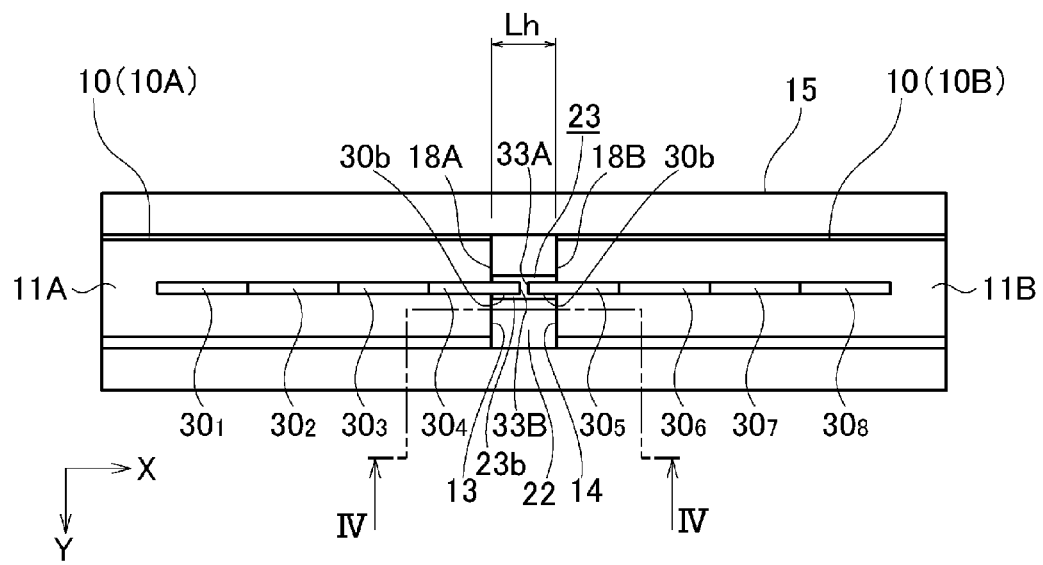
FIG. 10A is a plan view illustrating a state that the sensor substrates 10 are arranged according to the second embodiment.
Figure 10B:
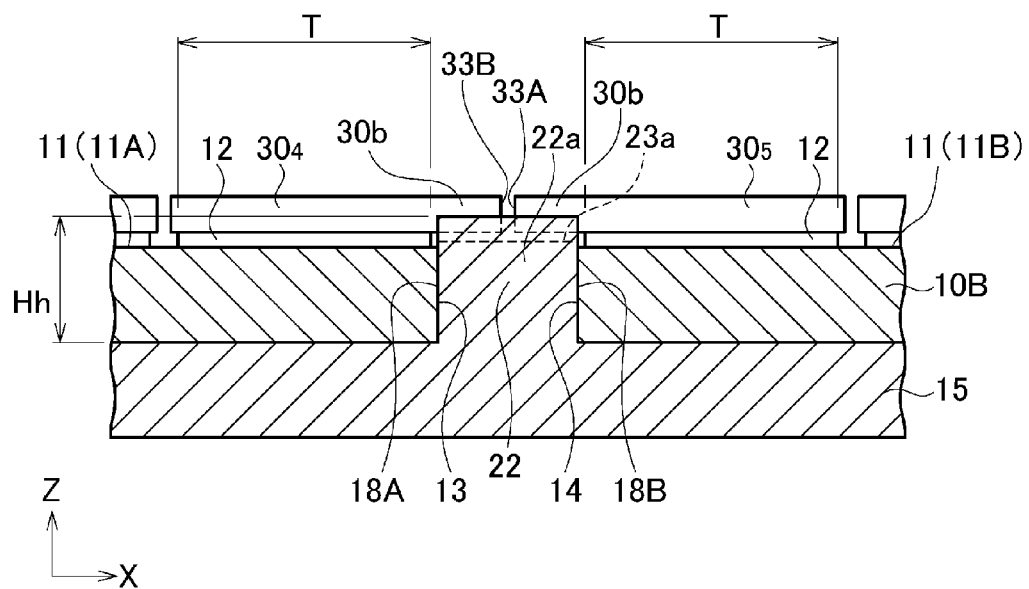
FIG. 10B is a sectional view of the state that the sensor substrates 10 are arranged according to the second embodiment.

The assembly worker gradually brings the sensor substrates 10A and 10B further closer and places the interval holding portion 17 between the sensor substrates 10A and 10B from the left and right as shown in a sectional view of FIG. 10A and a sectional view of FIG. 10B obtained by cutting a IV-IV line of FIG. 10A. As a result, the farthest tip 33B of the sensor chip $30_4$ of the sensor substrate 10A and the farthest tip 33A of the sensor chip $30_5$ of the sensor substrate 10B are arranged facing each other. In this case, the side surfaces 30b of the sensor chips $30_4$ and $30_5$ are abutted with the inner wall 23b of the groove portion 23. Therefore, the sensor chips $30_1$ to $30_8$ mounted on the sensor substrates 10A and 10B can be disposed in a line. In this way, the side surfaces 30b of the sensor chips $30_4$ and $30_5$ function as positioning sides. Therefore, the sensor chips 30 of the sensor substrates 10 can be easily positioned in the sub-scan direction.

In the present embodiment, the sensor substrates 10 can be mounted on the substrate holder 15 with the sensor chips 30 as reference points. Therefore, the sensor chips 30 can be more accurately and easily positioned in the sub-scan direction compared to when the positioning sides 19 and 20 of the sensor substrates 10 serve as the reference points as in the first embodiment.

Although the interval holding portion 22 is integrated with the substrate holder 15 in the embodiment described above, the arrangement is not limited to this. The interval holding portion 22 can be able to be moved in the main-scan direction in the substrate holding portion 16.

Third Embodiment

The methods of using the substrate holder 15 to position the adjacent sensor chips 30 in the arrangement of the two sensor substrates 10A and 10B have been described in the first and second embodiment. In the present embodiment, the sensor chips 30 can be positioned based on the shapes of sensor substrates 40A and 40B without using the substrate holder 15.

Figure 11A:
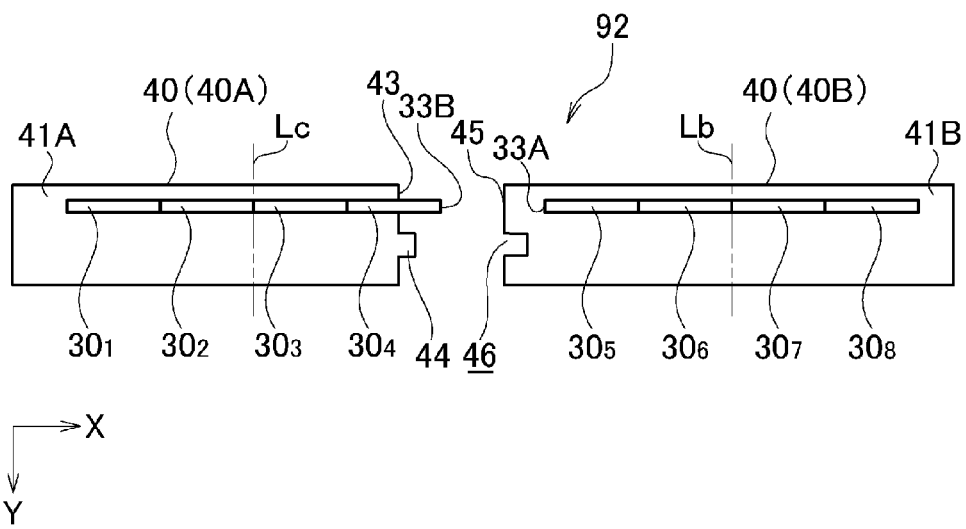
FIG. 11A is a plan view of a sensor substrate unit 92 according to the third embodiment.
Figure 11B:
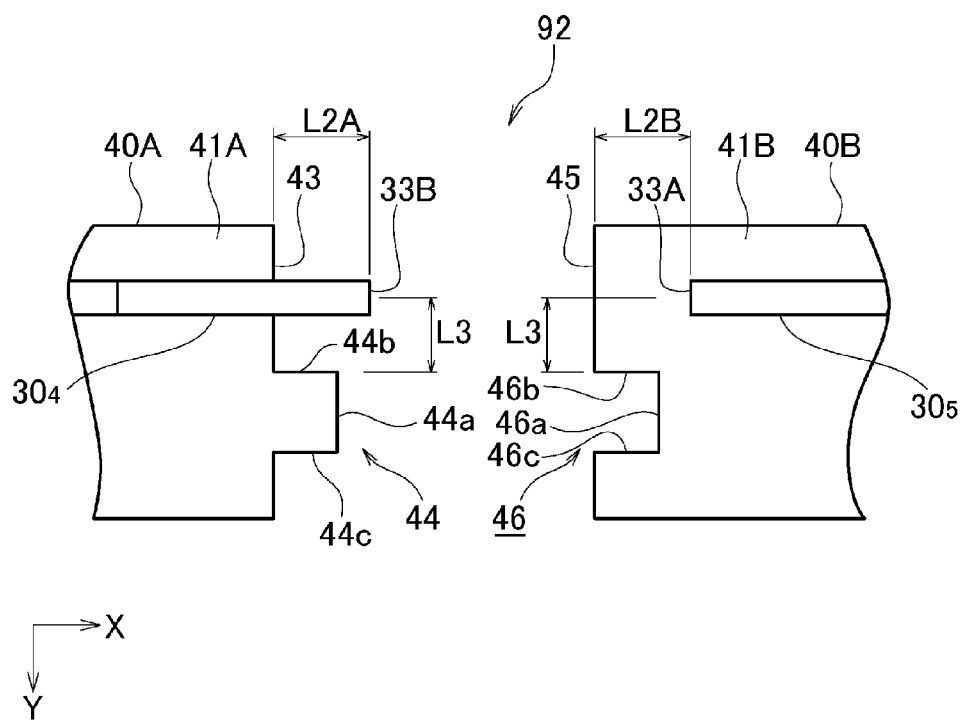
FIG. 11B is an enlarged plan view of the sensor substrate unit 92 according to the third embodiment.

FIG. 11A is a plan view illustrating a configuration of a sensor substrate unit 92 according to the present embodiment. FIG. 11B is an enlarged plan view of the sensor substrate unit 92. The sensor substrates 40 (40A and 40B) include convex portions 44 and concave portions 46 described later formed on the sensor substrates 10 (10A and 10B) of the first embodiment.

A plurality of (four each in FIG. 11A) sensor chips 30 ($30_1$ to $30_4$ and $30_5$ to $30_8$) are mounted on the mounting surfaces 41A and 41B of the sensor substrates 40A and 40B in a line in the main-scan direction and are deviated to the side where a convex portion 44 and a concave portion 46 are not formed in the sub-scan direction of the sensor substrates 40A and 40B.

In the sensor substrate 40A, the convex portion 44 is formed on an edge 43 on the right side that is the side connected to the sensor substrate 40B. Part of the convex portion 44 protrudes to the right side, and the convex portion 44 is fitted to the concave portion 46 formed on the sensor substrate 40B. As shown in FIG. 11B, the convex portion 44 is formed by: a side (hereinafter, "fitting side") 44a parallel to a side of the edge 43; and two positioning sides 44b and 44c adjacent to the fitting side 44a and orthogonal to the fitting side 44a.

The farthest tip 33B of the sensor chip $30_4$ close to the side of the adjacent sensor substrate 40B among the sensor chips $30_1$ to $30_4$ mounted on the sensor substrate 40A is positioned and fixed outside (right side) of the edge 43 of the sensor substrate 40A. The distance from the edge 43 of the sensor substrate 40A to the farthest tip 33B of the sensor chip $30_4$ is defined as L2A here. The sensor chips $30_1$ to $30_4$ are separated by a distance L3 from the positioning side 44b in the sub-scan direction and fixed.

In the sensor substrate 40B, the concave portion 46 is formed on an edge 45 on the left side that is the side connected to the sensor substrate 40A. Part of the concave portion 46 is recessed to the right side, and the concave portion 46 is fitted to the convex portion 44 formed on the sensor substrate 40A. As shown in FIG. 11B, the concave portion 46 is formed by: a side (hereinafter, "fitting side") 46a parallel to a side of the edge 45; and two positioning sides 46b and 46c adjacent to the fitting side 46a and orthogonal to the fitting side 46a.

The farthest tip 33A of the sensor chip $30_5$ close to the side of the adjacent sensor substrate 40A among the sensor chips $30_5$ to $30_8$ mounted on the sensor substrate 40B is positioned and fixed inside (right side) of the edge 45 of the sensor substrate 40B. The distance from the edge 45 of the sensor substrate 40B to the farthest tip 33A of the sensor chip $30_5$ is defined as L2B here. The sensor chips $30_5$ to $30_8$ are separated by the distance L3 from the positioning side 46b in the sub-scan direction and fixed.

A method of arranging the sensor substrates 40A and 40B will be described.

The assembly worker manufactures in advance the sensor substrates 40A and 40B on which the sensor chips $30_1$ to $30_4$ and $30_5$ to $30_8$ are mounted.

The assembly worker causes the edge 43 of the sensor substrate 40A and the edge 45 of the sensor substrate 40B to face each other.

The assembly worker gradually brings the sensor substrates 40A and 40B closer while fitting the convex portion 44 formed on the edge 43 of the sensor substrate 40A to the concave portion 46 formed on the edge 45 of the sensor substrate 40B.

Figure 12:
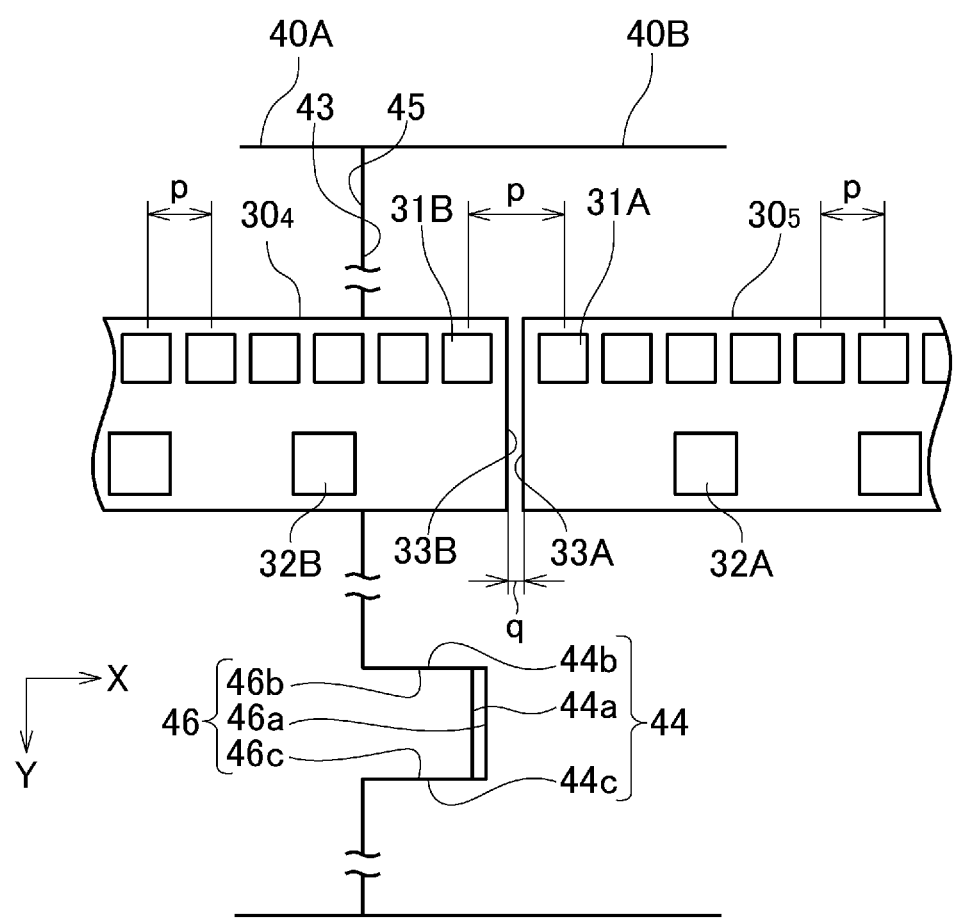
FIG. 12 is an enlarged plan view of the state that the sensor substrates 40 are arranged according to the third embodiment.

The sensor substrates 40A and 40B are further brought closer, and the fitting of the convex portion 44 and the concave portion 46 is completed as shown in FIG. 12. In this case, the edge 43 of the sensor substrate 40A is abutted with the edge 45 of the sensor substrate 40B, and the positioning side 44b of the convex portion 44 is abutted with the positioning side 46b of the concave portion 46. As described above, the sensor chips $30_1$ to $30_4$ and $30_5$ to $30_8$ are separated by the distance L3 from the positioning sides 44b and 46b in the sub-scan direction. Therefore, when the positioning side 44b of the convex portion 44 and the positioning side 46b of the concave portion 46 are abutted, the sensor chips $30_1$ to $30_8$ mounted on the sensor substrates 40A and 40B can be disposed in a line. As a result, the assembly worker can easily position the sensor chips 30 of the sensor substrates 40 in the sub-scan direction.

In this case, the sensor chip $30_4$ of the sensor substrate 40A extends over the sensor substrate 40B, and the farthest tip 33B of the sensor chip $30_4$ of the sensor substrate 40A and the farthest tip 33A of the sensor chip $30_5$ of the sensor substrate 40B face each other. The distance L2A from the edge 43 of the sensor substrate 40A to the farthest tip 33B of the sensor chip $30_4$ is the predetermined distance q shorter than the distance L2B from the edge 45 of the sensor substrate 40B to the farthest tip 33A of the sensor chip $30_5$. Therefore, when the edge 43 of the sensor substrate 40A is abutted with the edge 45 of the sensor substrate 40B, the interval between the farthest tips 33B and 33A is secured at the predetermined distance q. The securing of the interval between the farthest tips 33B and 33A at the predetermined distance q can make the interval between the photodiode 31B of the sensor chip $30_4$ of the sensor substrate 40A and the photodiode 31A of the sensor chip $30_5$ of the sensor substrate 40B equidistant to the pitch p of the photodiodes 31. In this way, the convex portion 44 and the concave portion 46 formed on the sensor substrates 40A and 40B can be fitted to easily position the sensor chips 30. The interval between the photodiode 31B of the sensor chip $30_4$ and the photodiode 31A of the sensor chip $30_5$ may not be the same distance as the pitch p and may be a distance greater than the pitch p. More specifically, as long as the interval between the photodiode 31B of the sensor chip $30_4$ and the photodiode 31A of the sensor chip $30_5$ is a predetermined distance, the image can be interpolated based on the predetermined distance after the image is read by the image sensor unit 1.

The assembly worker connects the sensor substrates 40A and 40B by screws or adhesive and incorporates the sensor substrates 40A and 40B into the frame 7 shown in FIG. 4 to fix the sensor substrates 40A and 40B to the frame 7 by screws or adhesive to manufacture the image sensor unit 1. In this way, the distance between the sensor chips $30_4$ and $30_5$ is maintained at the distance of the pitch p in the manufactured image sensor unit 1, and the image can be read without missing pixels.

In this way, the convex portion 44 formed on the edge 43 of the sensor substrate 40A is fitted with the concave portion 46 formed on the edge 45 of the sensor substrate 40B in the present embodiment. As a result, other members are not required, and the adjacent sensor chips 30 mounted on the sensor substrates 40A and 40B can be easily positioned.

Although the case of abutting the positioning side 44b of the convex portion 44 with the positioning side 46b of the concave portion 46 has been described in the embodiment described above, the arrangement is not limited to this. More specifically, a similar advantageous effect can be attained by abutting the positioning side 44c of the convex portion 44 with the positioning side 46c of the concave portion 46 to arrange the sensor substrates 40A and 40B.

Although one set of the convex portion 44 and the concave portion 46 is used to arrange the sensor substrates 40, a plurality of sets may be used.

Although the present invention has been described with various embodiments, the present invention is not limited to the embodiments, and various changes and the like can be made within the scope of the present invention.

For example, although the cases of arranging two sensor substrates have been described in the first to third embodiments, the arrangement is not limited to the cases. The present invention can be similarly applied to a case of arranging three or more sensor substrates.

More specifically, when three sensor substrates are to be arranged in the first and second embodiments, the components on the left side of a virtual line La of FIG. 8A can be positioned symmetrically with the virtual line La. When three or more sensor substrates are to be arranged, the interval holding portions 17 and 22 can be arranged independently from the substrate holder 15, and the interval holding portions 17 and 22 that can move in the main-scan direction in the substrate holding portion 16 can be included to easily assemble the sensor substrates.

In this case, all the interval holding portions 17 and 22 can be moved. Alternatively, one of the interval holding portions 17 and 22 can be integrally formed as a reference point, and the other interval holding portions 17 and 22 can be movable.

Furthermore, Lh of the interval holding portions 17 and 22 may be changed according to the assembly tolerance of the amount of protrusion L1 of the sensor chip 30, or may be selected from a plurality of interval holding portions 17 and 22 having different Lh.

When three sensor substrates are to be arranged in the third embodiment, the components on the left side of a virtual line Lb of FIG. 11A can be positioned symmetrically with the virtual line Lb. Alternatively, the components on the right side of a virtual line Lc of FIG. 11A can be positioned symmetrically with the virtual line Lc.

According to the present invention, adjacent sensor chips can be easily positioned when a plurality of sensor substrates are connected in the main-scan direction.

What is claimed is:

1. An image sensor unit comprising:
a light source that illuminates an object to be read;
a sensor substrate unit that is arranged with a plurality of sensor substrates comprising a plurality of photoelectric conversion elements arranged and mounted in a line in a longitudinal direction;
a substrate holder on which the sensor substrates are mounted;
a light condenser that focuses light from the object to be read on the sensor substrate unit; and
a supporting body that supports the light source, the substrate holder, and the light condenser, wherein
the sensor substrates are mounted on the substrate holder arranged in the longitudinal direction at predetermined intervals,
the photoelectric conversion elements at edges of the sensor substrates are mounted beyond the edges,
the substrate holder comprises positioning means that positions the photoelectric conversion elements and a holding portion parallel to the longitudinal direction,
the positioning means is arranged on the holding portion and comprises an abutment portion parallel to a width direction,
the edges of the sensor substrates in the width direction are abutted with an inner wall of the holding portion, and
the edges of the sensor substrates in the longitudinal direction are abutted with the abutment portion.

2. The image sensor unit according to claim 1, wherein
in the positioning means, a height dimension from a bottom surface of the holding portion is smaller than a thickness dimension of the sensor substrates.

3. The image sensor unit according to claim 1, wherein
the positioning means can move in the longitudinal direction in the holding portion.

4. The image sensor unit according to claim 1, wherein
the photoelectric conversion element comprises a pad connected to another circuit pattern by wire bonding using a thin metallic wire, and the pad is positioned inside of the edges of the sensor substrate in the main-scan direction.

5. An image sensor unit comprising:
a light source that illuminates an object to be read;
a sensor substrate unit that is arranged with a plurality of sensor substrates comprising a plurality of photoelectric conversion elements arranged and mounted in a line in a longitudinal direction;
a substrate holder on which the sensor substrates are mounted;
a light condenser that focuses light from the object to be read on the sensor substrate unit; and
a supporting body that supports the light source, the substrate holder, and the light condenser, wherein
the sensor substrates are mounted on the substrate holder arranged in the longitudinal direction at predetermined intervals,
the photoelectric conversion elements at edges of the sensor substrates are mounted beyond the edges,
the substrate holder comprises positioning means that positions the photoelectric conversion elements and a holding portion parallel to the longitudinal direction,
the positioning means comprises a groove portion formed parallel to a main-scan direction,
the photoelectric conversion elements mounted beyond the edges are abutted with an inner wall of the groove portion, and
the edges of the sensor substrates in the longitudinal direction are abutted with an abutment portion.

6. An image sensor unit comprising:
a light source that illuminates an object to be read;
a sensor substrate unit that is arranged with a plurality of sensor substrates comprising a plurality of photoelectric conversion elements arranged and mounted in a line in a longitudinal direction;
a substrate holder on which the sensor substrates are mounted;
a light condenser that focuses light from the object to be read on the sensor substrate unit; and
a supporting body that supports the light source, the substrate holder, and the light condenser, wherein
the sensor substrates are mounted on the substrate holder arranged in the longitudinal direction at predetermined intervals,
the photoelectric conversion elements at edges of the sensor substrates are mounted beyond the edges,
the substrate holder comprises an interval holding portion and a holding portion formed in parallel to a longitudinal direction, and
the interval holding portion is arranged between the edges of the sensor substrates in the holding portion to position the photoelectric conversion elements mounted beyond the edges.

7. The image sensor unit according to claim 6, wherein the interval holding portion is movable in the longitudinal direction in the holding portion or integrally formed with the substrate holder.

8. The image sensor unit according to claim 7, wherein
the interval holding portion comprises a groove portion formed parallel to a main-scan direction, and the photoelectric conversion elements mounted beyond the edges are respectively abutted with an inner wall of the groove portion.

9. The image sensor unit according to claim 6, wherein
the substrate holder comprises a plurality of the interval holding portions, and
one of the interval holding portions is integrally formed with the substrate holder and the other is movable in the longitudinal direction in the holding portion.

10. The image sensor unit according to claim 9, wherein the interval holding portions comprise groove portions formed parallel to a main-scan direction, and the photoelectric conversion elements mounted beyond the edges are respectively abutted with inner walls of the groove portions.

11. The image sensor unit according to claim 6, wherein
the substrate holder comprises a plurality of the interval holding portions, and
the interval holding portions are movable in the longitudinal direction in the holding portion.

12. The image sensor unit according to claim 11, wherein
the interval holding portions comprise groove portions formed parallel to a main-scan direction, and the photoelectric conversion elements mounted beyond the edges are respectively abutted with inner walls of the groove portions.

13. The image sensor unit according to claim 6, wherein
the interval holding portion comprises a groove portion formed parallel to a main-scan direction, and the photoelectric conversion elements mounted beyond the edges are respectively abutted with an inner wall of the groove portion.

14. An image reading apparatus comprising:
an image reading means comprising an image sensor unit configured to read light from an object to be read, wherein the image sensor unit comprises:
a light source that illuminates the object to be read;
a sensor substrate unit that is arranged with a plurality of sensor substrates comprising a plurality of photoelectric conversion elements arranged and mounted in a line in a longitudinal direction;
a substrate holder on which the sensor substrates are mounted;
a light condenser that focuses light from the object to be read on the sensor substrate unit; and
a supporting body that supports the light source, the substrate holder, and the light condenser,
the sensor substrates are mounted on the substrate holder arranged in the longitudinal direction at predetermined intervals,
the photoelectric conversion elements at edges of the sensor substrates are mounted beyond the edges,
the substrate holder comprises an interval holding portion and a holding portion formed in parallel to a longitudinal direction, and
the interval holding portion is arranged between the edges of the sensor substrates in the holding portion to position the photoelectric conversion elements mounted beyond the edges.

15. An image forming apparatus comprising:
an image reading means comprising an image sensor unit configured to read light from an object to be read; and
an image forming means that forms an image on a recording medium, wherein the image sensor unit comprises:
a light source that illuminates the object to be read;
a sensor substrate unit that is arranged with a plurality of sensor substrates comprising a plurality of photoelectric conversion elements arranged and mounted in a line in a longitudinal direction;
a substrate holder on which the sensor substrates are mounted;
a light condenser that focuses light from the object to be read on the sensor substrate unit; and a supporting body that supports the light source, the substrate holder, and the light condenser, the sensor substrates are mounted on the substrate holder arranged in the longitudinal direction at predetermined intervals, the photoelectric conversion elements at edges of the sensor substrates are mounted beyond the edges, the substrate holder comprises an interval holding portion and a holding portion formed in parallel to a longitudinal direction, and the interval holding portion is arranged between the edges of the sensor substrates in the holding portion to position the photoelectric conversion elements mounted beyond the edges.

\* \* \* \* \*